United States Patent [19]

Spadafora et al.

[11] Patent Number: 4,743,456

[45] Date of Patent: May 10, 1988

[54] APPARATUS AND METHOD FOR APPLYING A UNIFORM COATING TO FOOD

[75] Inventors: Paul F. Spadafora, Montville; James R. Davis, Boonton; Jim Blandine, Kingwood, all of N.J.

[73] Assignee: Nabisco Brands, Inc., Parsippany, N.J.

[21] Appl. No.: 947,679

[22] Filed: Dec. 30, 1986

[51] Int. Cl.$^4$ .......................... A23B 7/16; B05C 5/00; B05D 3/12
[52] U.S. Cl. ........................................ 426/293; 118/24; 118/323; 239/222; 426/307; 427/240; 427/424
[58] Field of Search ............... 426/302, 307, 289, 293; 118/24, 300, 323; 427/240, 424; 239/222, 7

[56] References Cited

U.S. PATENT DOCUMENTS 3,014,812 12/1961 Sallie .................................. 427/240
4,032,667 6/1977 Kreuter ................................. 118/24

Primary Examiner—George Yeung
Attorney, Agent, or Firm—Richard Kornutik

[57] ABSTRACT

Apparatus and method for uniformly coating pieces of food with a viscous, particulate-containing composition in which the coating, e.g., a flavored oil containing, for example, spices, is fed to a rotatable, enclosed, frustoconical reservoir enclosed within a housing having a series of serrations along its upper rim. Centrifugal force radially sprays the coating through the serrations, which serve to limit the size of the particulates in the coating. The coating spray exits the housing and coats pieces of food transported external to the housing.

8 Claims, 3 Drawing Sheets

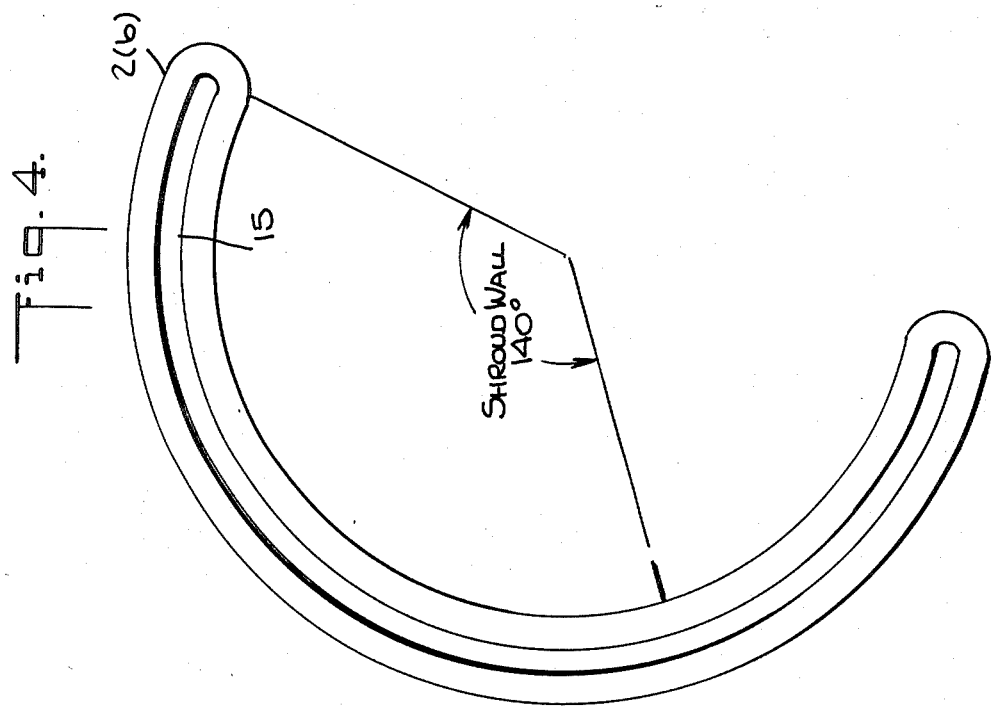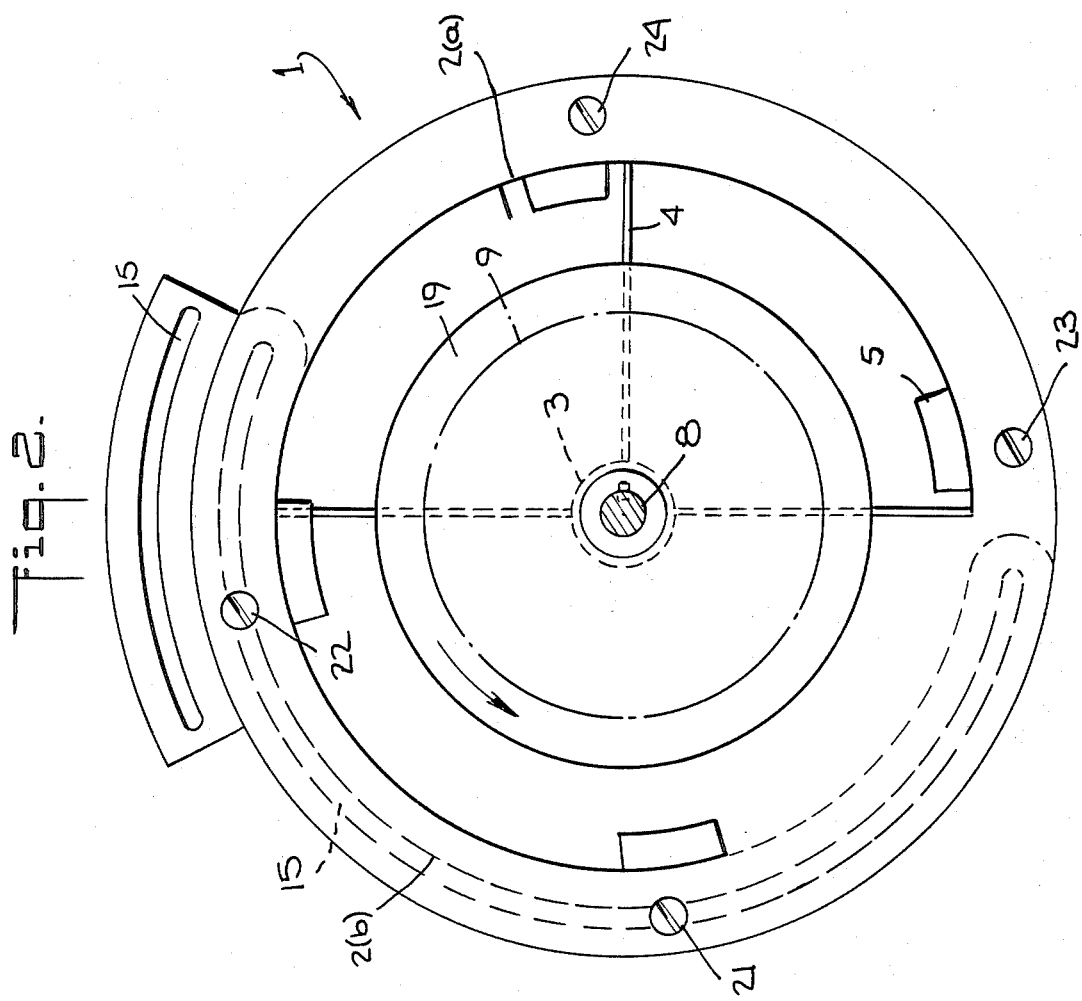

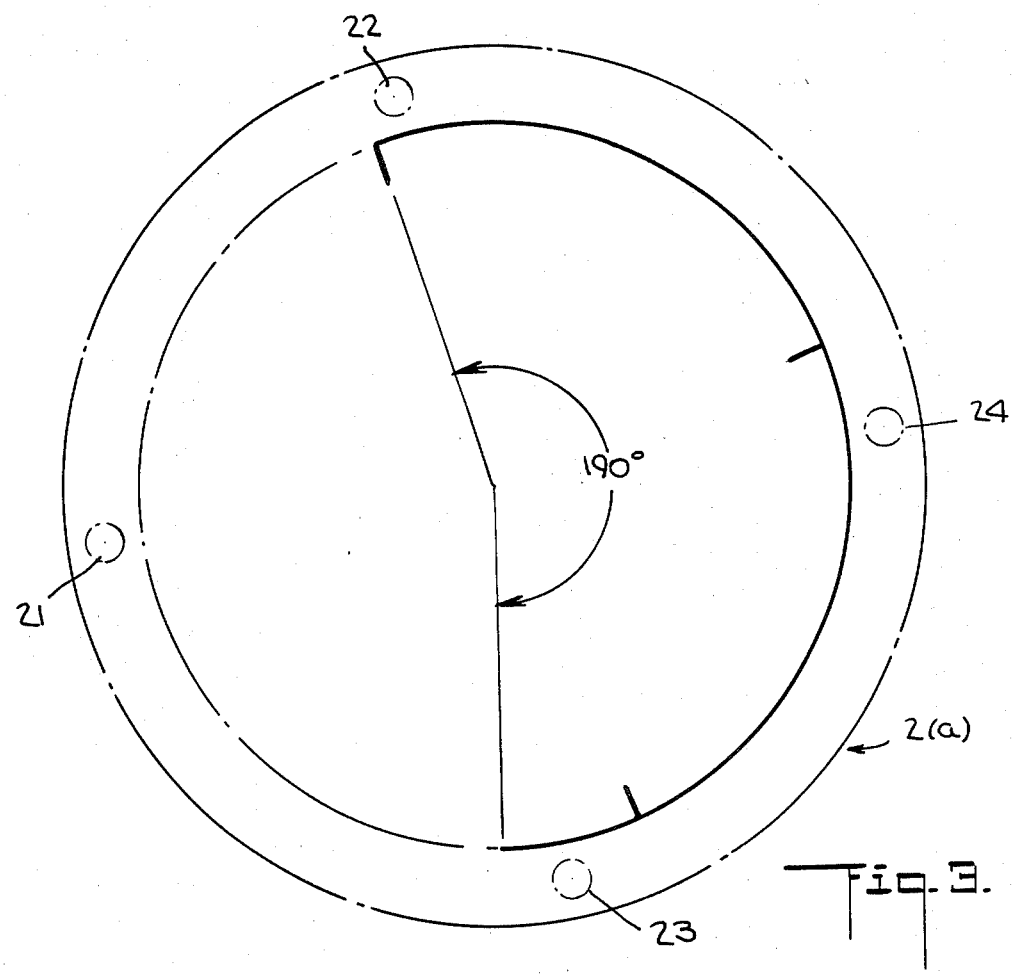
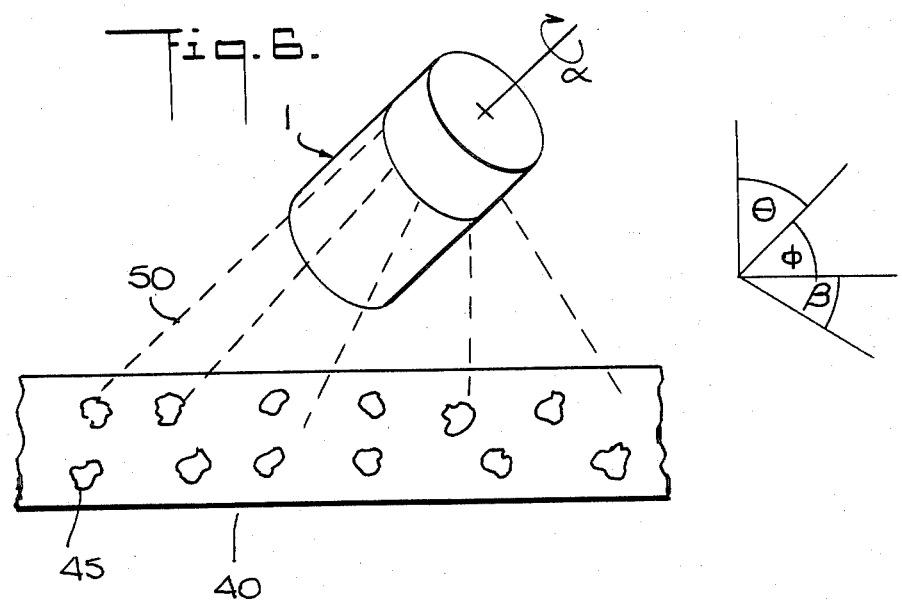

APPARATUS AND METHOD FOR APPLYING A UNIFORM COATING TO FOOD

FIELD OF THE INVENTION

The present invention relates generally to a centrifugal spraying device useful in coating the surfaces of pieces of food, e.g., crackers, with a viscous, particulate-containing material, e.g., a flavored oil containing, for example, spices. In particular, this invention relates to an apparatus and method for coating the surfaces of such particles in such a manner so as to ensure an even distribution of uniform-sized particles of the coating materials on the surface of the piece of food.

2. Description of the Prior Art

Apparatus and methods which utilize centrifugal force in coating a variety of items are well known in the prior art. U.S. Pat. No. 3,279,427, issued to Clancy, et al., discloses centrifugal spraying equipment which utilizes centrifugal force to spin a settable plastic composition onto the interior of a concrete pipe. In Clancy, et al. this settable plastic composition is fed through a rotating cone-shaped nozzle and impinges upon a dish-shaped head in such a manner that centrifugal force propels the coating particles upwardly along the sides of the dish-shaped head and through the apertures of a mesh screen. The centrifugal spraying apparatus of Clancy, et al. is positioned concentrically within the interior of a pipe so as to coat the inner surface of such a pipe.

In U.S. Pat. No. 3,459,586, issued to Kiwiet, et al., a centrifugal spray coating method and apparatus is disclosed for coating the interior surfaces of a cylindrical item. The apparatus disclosed in Kiwiet, et al. consists of an axially translatable centrifugal spray head having a rotatably driven centrifugal distributor with a centrally disposed charge cavity and a plurality of outwardly flared distributor teeth. A multiplicity of coaxial, axial spaced angular discs are positioned concentric to the spray head so that the radial gap between the inner marginal edges of the discs and the outer radial extremities of the distributor is sufficiently great to ensure uniform application of spray material about the entire inner most marginal edges of all of the discs.

In U.S. Pat. No. 3,702,252, issued to Veltman, et al., a process for preparing chocolate crumbs is disclosed wherein the required ingredients for forming a solid chocolate crumb are formed into separate solid and liquid phases and those phases are sprayed into a current of heated gas so that the solids are showered through a mist of droplets of the liquid and the resulting product is carried from the spraying zone by the gas current. Veltman, et al. disclose the use of centrifugal spray dryers for supplying a current of heated air and for atomizing the liquid and providing a means of showering solid through the mist of liquid droplets.

Neither Clancy, et al., Kiwiet, et al. or Veltman, et al. address the problems attendant to coating food particles with a uniform coat of a viscous, particulate-containing material. These problems, experienced in using the apparatus and methods of the prior art, include clogging of both the pumping means used to convey the viscous coating material to the spraying means and the nozzle means used to spray the coating material on the item to be coated. It has also proven to be very difficult to coat a food particle evenly with the particulate coating so that uniform-sized particles are evenly distributed throughout the surface of the coated item. These problems are exacerbated in the use of prior art apparatus and processes when the particles to be coated are externally transported relative to the spraying device by means of a conveyer belt. In such manufacturing techniques, common to food processing, the area of the coating spray which comes in contact with the material to be coated is necessarily limited and must contain a uniform distribution of particles. For example, in coating crackers it has proven difficult to coat the individual crackers with an evenly distributed coating of oil containing spices or other flavoring material.

A need exists, therefore, for an apparatus and method capable of coating a piece of food with a viscous particulate-containing coating material in such a manner so that the piece of food is evenly coated with a composition containing particulates of a uniform size. Further, the need exists for such an apparatus and method capable of coating pieces of food in this manner without experiencing the problems of clogging and uneven coating distribution attendant to the apparatus and methods of the prior art. In addition, the need exists for such an apparatus and method capable of coating pieces of a composition containing uniform size particulates when such pieces of food are transported external to the coating apparatus by means of a conveyor belt.

Accordingly, it is an object of the present invention to provide an apparatus and method for evenly coating pieces of food with a viscous composition containing particulates of a uniform size.

It is a further object of the present invention to provide such an apparatus and method capable of coating pieces of food with an even coating of a viscous, particulate-containing material wherein the pieces of food to be coated are externally transported relative to the coating apparatus by means of a conveyor belt.

Other objects and advantages will be in part apparent and in part hereinafter pointed out.

SUMMARY OF THE INVENTION

In accordance with the above-stated objects an apparatus and method for applying a uniform coating of a particulate-containing material onto the surfaces of pieces of food are disclosed in which the coating apparatus, e.g., a coating sprayer for applying a coating of oil containing, for example, spices to crackers, comprises an apertured cylindrical housing means having segmented shroud means circumferentially positioned within the interior of the housing so as to prevent the undesirable upward spraying of coating out of the housing and which further serve to guide the spray out of the aperture in the side of the housing and onto pieces of food transported externally relative to the housing. A viscous, particulate-containing coating composition is coaxially fed through the interior of the housing and into the lower end of an inverted, frustoconical reservoir which is coaxially and receivably connected to the feed pipe. This reservoir has a sequential pattern of serrations along the circumference of its upper rim. The reservoir is connected to a motor driven drive shaft which rotates the reservoir so as to centrifugally propel the feed stream upwardly along the sides of the reservoir, thereby causing the feed stream to impinge upon the serrations of the upper rim of the reservoir so as to form a radial coating spray which impacts with the surfaces of a shroud affixed to the interior of the housing. The coating spray is therefter guided outwardly from the interior of the housing and sprays onto pieces of food, e.g., crackers, transported relative to the housing by means of a conveyor belt.

In one embodiment of this invention the shroud means circumferentially positioned within the interior of the housing is segmented into two pieces; one of which is fixed to the interior of the housing and the other of which is circumferentially adjustable about the interior of the housing, thereby permitting the path of the coating spray which is propelled against the side of the shroud to be adjusted in accordance with the positioning of the spraying apparatus relative to the conveyor belt which transports the pieces of food to be coated.

The sequential pattern of serrations along the circumference of the upper rim of the frustoconical reservoir can consist, e.g., of a number of square teeth of a specific height and width sufficient to ensure that the impingement of a particle of a viscous coating composition will result in a coating spray containing particulates of a substantially uniform size as determined by the height and width of the serrations.

The parameters of the present invention which can be adjusted in order to achieve the desired coating consistency include the rotational speed of the drive shaft motor as well as the dimensions of the serrations located on the circumference of the upper rim of the reservoir. These parameters are in turn a function of the viscosity of the particulate-containing feedstream as well as the size of the particulates contained within that stream. Additional parameters which can be adjusted to achieve the desired coating include the orientation of the adjustable shroud relative to the serrated upper rim of the reservoir and the general alignment of the spray apparatus relative to the conveyor belt along which the pieces of food are transported.

BRIEF DESCRIPTION OF THE DRAWINGS

FIG. 2 is an elevational view of a spray unit taken along line 1—1' of FIG. 1 which illustrates the orientation of the fixed and adjustable shroud relative to the serrated upper rim of the inverted frustoconical reservoir;

FIG. 3 is an isolated elevated perspective of the dimensions of the fixed portion of the shroud;

FIG. 4 is an isolated, elevated perspective of the dimensions of the adjustable portion of the shroud;

FIG. 6 is a pictorial representation of the embodiment shown in FIG. 1 in operation to apply a coating of flavored oil containing, e.g., spices, to a stream of crackers.

DETAILED DESCRIPTION OF A PREFERRED EMBODIMENT

Figure 1:
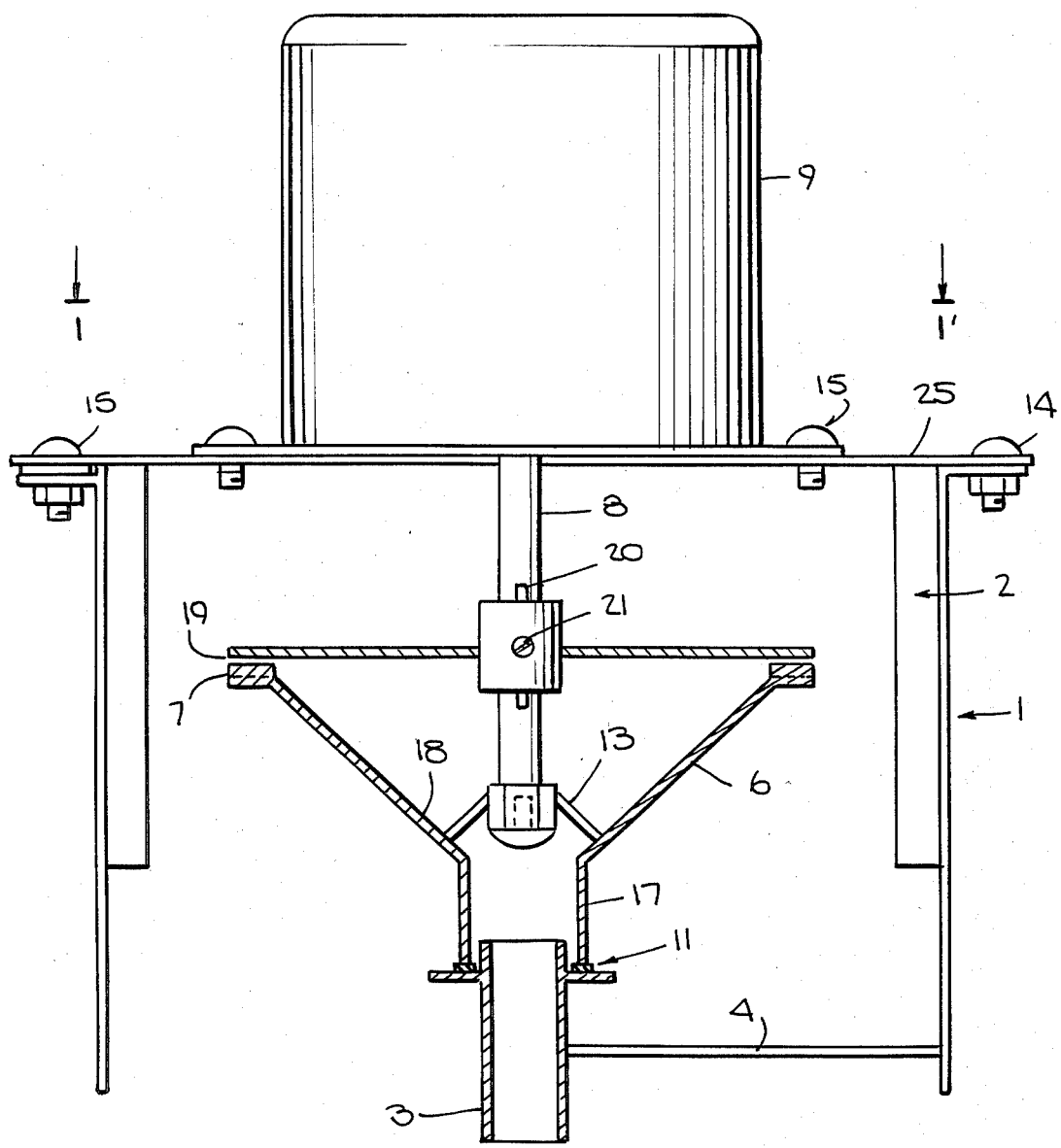
FIG. 1 is a cross-sectional view of a spray unit unit which embodies the present invention.

Referring to FIG. 1 and FIG. 2, an apparatus for applying a uniform coating of a particulate-containing material onto the surfaces of pieces of food is illustrated in which cylindrical housing means 1 having a head 25 secured by bolts 14 and 15 encompasses an adjustable two-piece shroud 2 circumferentially positioned within the interior of housing means 1. The adjustable two-piece shroud 2 is segmented into a fixed section 2(a) and an adjustable section 2(b). The adjustable shroud section 2(b) is circumferentially rotatable along a slot 15 as depicted in FIG. 2 and serves to prevent the coating spray from spraying upwardly out of the housing. The fixed section 2(a) is attached to the inner wall of housing 1 as illustrated in FIG. 2.

Feed pipe 3 is coaxially positioned within the interior of housing 1 and, in the embodiment of the invention shown in FIG. 1, is rigidly secured to the interior of housing 1 by means of three feedpipe support brackets 4. An inverted frustoconical reservoir 6 is coaxially connected to the feedpipe 3 at the point where reservoir extension 17 is joined to the upper, outflow end of feedpipe 3. Reservoir extension 17 is joined to the upper, outflow end of feedpipe 3 by means of wear seal 11.

Inverted, frustoconical reservoir 6 comprises sides 18 which slope upwardly from their point of connection with the top of extension 17. Sides 18 terminate at the upper rim 7 which contains a sequence of serrations having a fixed width and height. Reservoir 6 is enclosed by means of cover 19 which includes a central cylindrical aperture which is coaxial to feedpipe 3 and reservoir extension 17. Cover 19 is supported by reservoir rim 7.

A drive shaft 8 is inserted through the aperture in cover 19 and is secured to cover 19 by means of locking set screw 21 and key 20. This drive shaft 8 is rigidly connected to the lower ends of reservoir sides 18 by means of four brackets 13. In one embodiment of this invention, the lower end of drive shaft 8 is rigidly connected to brackets 13 by connecting brackets 13 to a left-hand locking screw 12 attached to the bottom end of drive shaft 8.

In the embodiment of the invention illustrated in FIG. 1 the upper end of drive shaft 8 is engagingly connected to a drive means comprising a one-half H.P. A.C. variable speed motor of the type well known in the art. The motor 9 illustrated in FIG. 1 has a rotational speed of up to 10,000 RPM. This motor 9 can be positioned on top of cylindrical housing 1 as illustrated in FIG. 1 and can be secured in such a position by means of bolts 15. The reservoir 6 is positioned within housing 1 at such an elevation so that when variable speed motor 9 engages drive shaft 8, thereby causing reservoir 6 to rotate, the particles of feed which are centrifugally hurled upwardly along the reservoir sides 18 and through the serrations of upper rim 7 are propelled radially against the sides of two-piece shroud 2.

It is an essential element of the present invention that the viscosity of a feedstream flowing through feedpipe 3 be correlated with the rotational speed of the drive shaft 8 and the dimensions of the serrations in the upper rim 7 of reservoir 6 such that the centrifugal force imparted upon a particle of feedstream as a result of the rotation of reservoir 6 will cause the feedstream to flow upwardly along reservoir sides 18 and through the serrations in the upper rim 7 of the reservoir 6. Such a correlation ensures that the effluent which is sprayed radially from the serrations in the upper rim 7 of the reservoir 6 and against the adjutable two-piece shroud 2 will contain particles of a uniform size corresponding approximately to the dimensions of the serrations in the upper rim 7 of reservoir 6.

The coating spray is then guided outwardly from the interior of housing 1 by shroud section 2(a) and 2(b) and is sprayed onto pieces of food transported externally to the housing.

In the embodiment of the invention illustrated in FIG. 2, adjustable shroud segment 2(b) encompasses 140° of the inner circumference of housing 1. Fixed shroud segment 2(a) encompasses 190° of the inner circumference of housing 1. As illustrated in FIG. 2, adjustable shroud segment 2(b) contains a centrally located slot 15 so that adjustable shroud segment 2(b) can be circumferentially adjusted along slot 15 as delimited by bolts 21 and 22. FIG. 2 also depicts the centrally located feedpipe 3 and the three feedpipes support brackets 4 which rigidly attach the feedpipe 3 to the interior of housing 1. The interior of housing 1 is further supported by baffles 5. Fixed shroud segment 2(a) (not illustrated in FIG. 2), is fixed to the interior of the housing by means of bolts 23 and 24.

FIG. 3 depicts an isolated perspective of fixed shroud segment 2(a) in which the circumferential extent of fixed shroud segment 2(a) around the inner circumference of housing 1 is 190°. As shown in FIG. 2 and FIG. 3, fixed shroud segment 2(a) is rigidly attached to the interior of housing 1 by means of bolts 23 and 24. Bolts 21 and 22, which serve as delimiting means for slot 15 (not illustrated in FIG. 3), are also depicted.

FIG. 4 is an isolated illustration of adjustable shroud segment 2(b) and slot 15 in which the portion of the inner circumference of housing 1 encompassed by the adjustable shroud is 140°.

Figure 5:
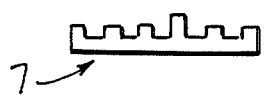
FIG. 5 is a detailed illustration of a group of the serrations positioned along the circumference of the upper rim of the reservoir.

FIG. 5 provides a detailed illustration of one type of patern of serrations sequentially positioned along the circumference of the upper rim 7 of reservoir 6. In the embodiment of the invention illustrated in FIG. 5, the serrations consist of a sequence of teeth having an approximate height of ⅜ inch and approximate width of 1/16 inch positioned so that a group of 6 teeth are located every 40° around the circumference of the upper rim 7 of inverted frustoconical reservoir 6 (thereby providing a total of nine groups of serrated teeth). As previously discussed, the dimensions of the serrations along upper rim 7 are a key parameter in achieving a uniform spray in accordance with the apparatus and method of the present invention. Serration 7 also serves to support cover 19 on top of the upper rim of inverted frustoconical reservoir 6.

FIG. 6 is an illustration depicting the orientation of the spray apparatus of the present invention rotating at a rotational speed relative to a conveyor belt 40 which transports pieces of food 45 beneath the aperture in housing 1, which can be oriented relative to the conveyor belt 40 by varying angles $\theta$, $\phi$ and $\beta$ so as to ensure spray 50 adequately coats food pieces 45. The spray apparatus can be positioned relative to the conveyor belt 40 by means well known in the art.

The apparatus and methods of the present invention have proven to be very useful in coating pieces of food with high viscosity coatings containing large size particulates, e.g., flavored oil, containing, onion flakes and oregano and parsley particles having a diameter of approximately ½ inch. By positioning the spray apparatus of the present invention over a conveyor belt which transports pieces of food external to housing 1, crackers have been coated with a high viscosity flavored oil containing spices having a uniform size. In particular, when the adjustable and fixed shrouds were utilized within the housing spray apparatus, a highly satisfactory uniform spray coating on the particles was achieved.

It is understood that the invention is not limited to the illustrations described and shown herein, which are deemed to be merely illustrative of the best modes of carrying out the invention. The invention also encompasses all such modifications which are within the scope of the following claims.

We claim:
1. An apparatus for applying a uniform coating of a viscous particulate-containing material onto the surfaces of pieces of food comprising:
   (a) covered, apertured cylindrical housing means;
   (b) means for transporting a viscous, particulate-containing feedstream coaxially positioned in the interior of the housing;
   (c) inverted frustoconical reservoir means coaxially, receivably and rotatably connected to the transporting means at its lower rim and having along the circumference of its upper rim a sequential pattern of serrations, the upper rim further serving to support reservoir covering means;
   (d) rotatable shaft means coaxial to the feed means and reservoir means and extending through an aperture in the housing and reservoir covering means so as to rigidly connect with the lower portion of the reservoir means;
   (e) segmented shroud means circumferentially positioned within the interior of the housing means;
   (f) driving means engagingly connected to the shaft means so that when activated the shaft, and therefore the reservoir, rotates so as to centrifugally propel feed stream particles upwardly along the sides of the reservoir, thereby causing those particles to impinge upon the serrations of the upper rim of the reservoir, resulting in a radial spray of coating material containing uniform-sized particulates which impinges upon the sides of the segmented shroud which directs the spray outwardly from the interior of the apertured housing means and coats pieces of food transported externally to the housing means.

2. The apparatus of claim 1 in which the segmented shroud means being in part fixed to the interior of the housing and in part circumferentially adjustable about the interior of the housing.

3. The apparatus of claim 1 in which the sequential pattern of serrations along the circumference of the upper rim of the reservoir comprise a series of square teeth having a fixed height and width positioned along the circumference of the rim so as to ensure a radial spray of coating material containing uniform-sized particulates.

4. The apparatus of claim 2 in which the segmented shroud means comprises a fixed segment encompassing more than half of the circumference of the upper rim of the reservoir and an adjustable segment encompassing less than half of the remainder of the circumference of the upper rim of the reservoir, the adjustable segment shroud containing a centrally disposed interior track along which the adjustable shroud segment can be rotated to a number of positions intermediate between two delimiting means.

5. The apparatus of claim 1 further comprising means for rigidly securing the means for transporting the feedstream to the interior of the housing.

6. The apparatus of claim 1 further comprising longitudinal baffles arranged along the interior of the housing means.

7. An apparatus for applying a uniform coating of a viscous, particulate-containing material onto pieces of food comprising:
   (a) cylindrical, apertured housing means;
   (b) a head which covers and overlaps the cylindrical housing and which is attached to the housing by means of bolts;

(c) baffles longitudinally attached to the interior of the housing at positions located every 90° around the circumference of the housing;

(d) a two-piece segmented shroud circumferentially positioned within the interior of the housing and having a fixed segment rigidly attached to the interior of the housing by means of bolts and which emcompasses approximately 190° of the interior circumference of the housing, and an adjustable segment containing a slot which enables this segment to be rotated between two delimiting bolts, the adjustable segment encompassing approximately 140° of the interior circumference of the housing;

(e) a feedpipe coaxially positioned within the housing and rigidly attached to the interior of the housing by three support brackets;

(f) an inverted frustoconical reservoir having at its lower end a cylindrical extension which is coaxially and rotatably connected to the outflow end of the feedpipe and which is sealed at its point of connection with the feedpipe by means of a wear seal and which has along the circumference of its upper rim a sequential pattern of serrations comprising nine sets of six square teeth, the teeth having an approximate height of ⅛ of an inch and an approximate width of 1/16 of an inch, the groups of serrations being positioned every 40° around the circumference of the upper rim, the upper rim being affixed to a cylindrical covering;

(g) a rotatable drive shaft coaxial to the feedpipe and reservoir extension which extends through both an aperture in the housing covering and an aperture in the reservoir cover and which is rigidly connected to the upwardly sloping sides of the reservoir by means of four brackets attached to a left-hand locking screw positioned on the lower end of the driveshaft, the drive shaft being further secured by means of a set screw and key positioned within the apperature of the reservoir cover;

(h) driving means comprised of a variable speed motor with a speed of at least 10,000 RPM engagingly connected to the drive shaft and bolted to the housing covering so that when the motor is activated the shaft, and therefore the reservoir, rotates so as to centrifugally propel a feedstream particle from the output end of the feed-pipe upwardly along the side of the reservoir, thereby causing those particles to impinge upon the serrations of the upper rim of the reservoir, resulting in a radial spray of coating material containing uniform sized particulates which impinge upon the sides of the segmented shroud which directs the spray outwardly from the interior of the apertured housing means and coats pieces of food transported externally relative to the housing.

8. A method for applying a uniform coating of a particulate-containing material onto the surfaces of pieces of food comprising:

(a) transporting upwardly through means comprising feedpipe a viscous, particulate-containing feedstream;

(b) receiving the particulate-containing feedstream into the lower end of an inverted frustoconical reservoir positioned within an apertured cylindrical housing and coaxially and rotatably connected to the feedpipe at its lower rim and having along the circumference of its upper rim a sequential pattern of serrations and a cover which is rigidly attached to the upper rim of the reservoir;

(c) generating a coating spray containing uniform-size particulates by rotating the reservoir by means of a motor-driven shaft coaxial to the feedpipe and attached to the lower end of the reservoir, thereby imparting a centrifugal force to the feedstream particles which propels those particles upwardly along the sides of the reservoir and causes them to radially impinge against the serrations located along the circumference of the upper rim of the reservoir;

(d) conveying the coating spray outwardly from the interior of the housing and onto pieces of food transported externally relative to the housing by means of a conveyor belt so that those pieces of food are uniformly coated with the particulate-containing coating material.

* * * * *